Patented May 13, 1947

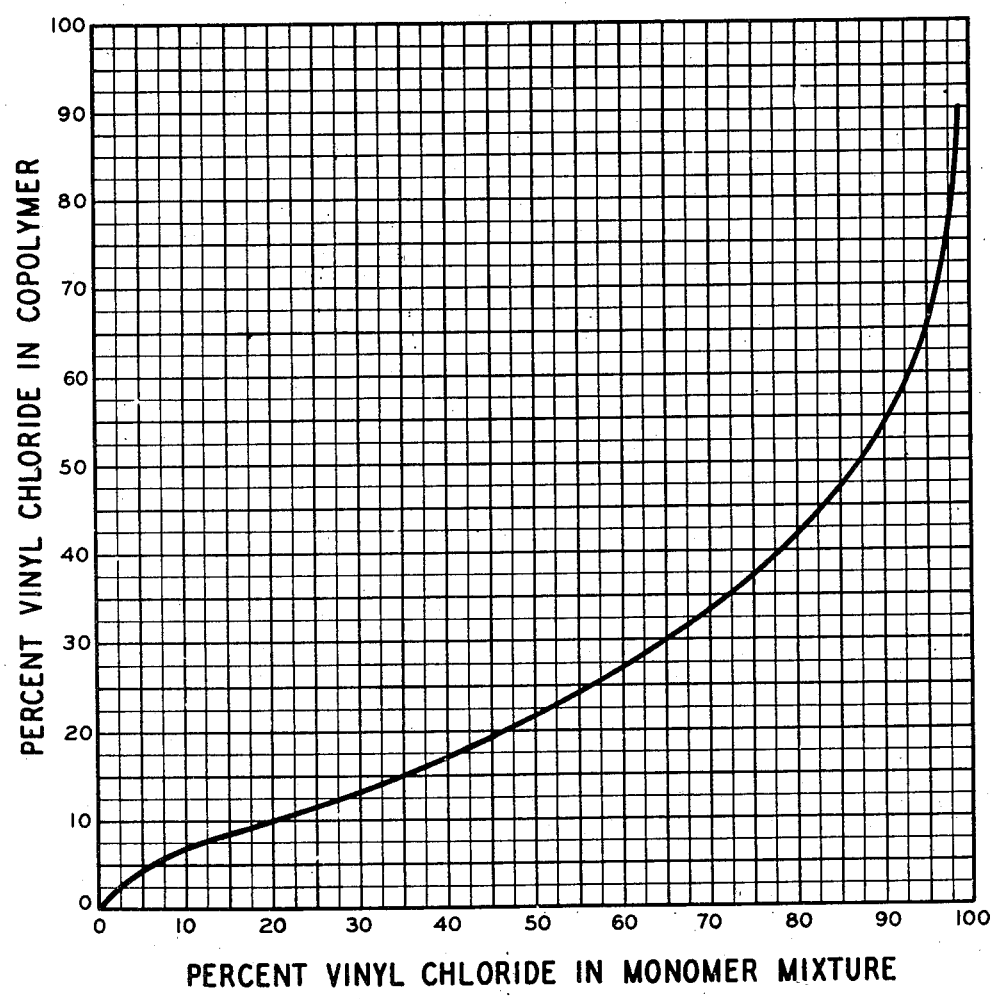

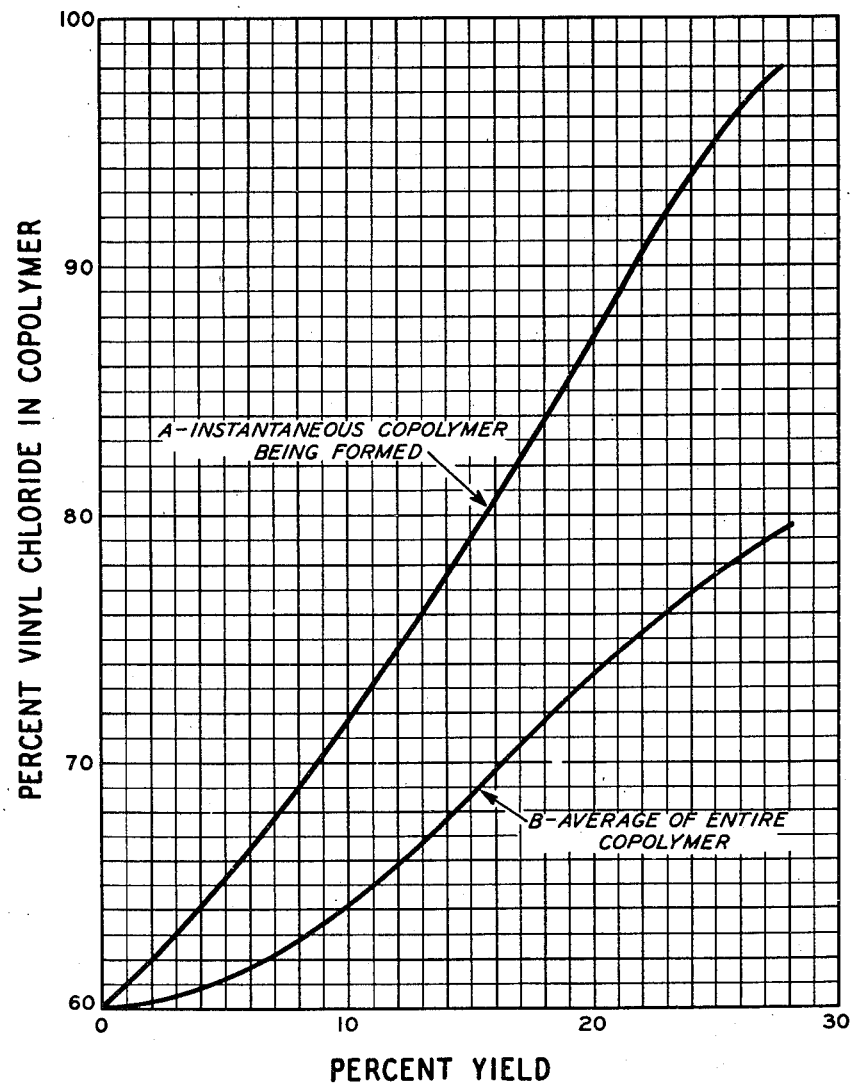

2,420,330

UNITED STATES PATENT OFFICE 2,420,330

VINYL CHLORIDE COPOLYMER AND PROCESS FOR MAKING IT

Leland C. Shriver, South Charleston, and George H. Fremon, Charleston, W. Va., assignors to Carbide and Carbon Chemicals Corporation, a corporation of New York Application May 26, 1943, Serial No. 488,508

19 Claims. (Cl. 260—84)

Copolymers of vinyl chloride with certain other polymerizable compounds, particularly esters, such as vinyl acetate or acrylate esters, are known. These copolymerized esters are believed to act as internal plasticizers, and resins result which are much more soluble than polyvinyl chloride in organic solvents, such as acetone. Such products are useful, therefore, in the production of lacquers and artificial fibers, but their resistance to thermal deformation is such that they lack utility in applications involving resistance to temperatures of 100° C. or higher.

According to this invention, a vinyl chloride copolymer is produced which is soluble in acetone and which possesses utility in applications involving resistance to deformation at temperatures above 100° C. This copolymer is formed by the conjoint polymerization of vinyl chloride with acrylonitrile. Polyinvyl chloride of a useful molecular weight range is insoluble in acetone with the exception of a small fraction of lower polymers, and polyacrylonitrile is completely insoluble in acetone. By means of this invention, a copolymer of vinyl chloride and acrylonitrile is obtained which is soluble in acetone. Such acetone-soluble copolymers are obtained by adjusting the polymerization conditions so that the amount of copolymerized vinyl chloride within these new resins will be within the range of about 45% to 80% by weight. However, for any given copolymer of vinyl chloride and acrylonitrile produced by the process of this invention, the vinyl chloride content of the macro-molecules comprising said copolymer may be substantially uniform.

This uniformity in composition, as well as their complete solubility in acetone, distinguish the copolymers of this invention from the products superficially examined in the prior art. The uniformity of the products of this invention, and their solubility in acetone, arose from the discovery and adaptation of a unique phenomenon associated with the conjoint polymerization of vinyl chloride and acrylonitrile. It has been found that acrylonitrile copolymerizes at a rate very much faster than does vinyl chloride. As a consequence, the percentage of combined acrylonitrile in the copolymer will be very much greater than the percentage of acrylonitrile in the mixture of vinyl chloride and acrylonitrile monomers subjected to polymerization. This relationship is shown in Figure 1 where the resin composition given is that of the copolymer first formed from any specified mixture of monomers. The relationship illustrated in Figure 1 is applicable at the usual polymerization temperatures to the copolymerization of the monomers alone, or to the copolymerization of the monomers when dissolved in solvents or emulsified in water.

In order to obtain acetone-soluble copolymers of vinyl chloride with acrylonitrile, containing an amount of copolymerized vinyl chloride within the range of 45% to 80% by weight of the copolymer, the relationship shown by the curve of Figure 1 indicates that the monomeric mixture charged to the polymerization autoclave should contain from 83.5% to 98% vinyl chloride by weight. Heretofore, the prior art has been ignorant of the fact that the charging ratio of vinyl chloride to acrylonitrile has an extreme effect on the composition of the copolymer, and the copolymers produced by the processes of the prior art have been insoluble in acetone, they have contained high percentages of combined acrylonitrile, and they have been so lacking in uniformity as to be of little or no value commercially. The copolymers of this invention are further distinguished from those of the prior art, in that they do not dissolve in aqueous sodium hydroxide solutions. It has been determined, however, that copolymers of vinyl chloride and acrylonitrile which contain less than about 30% copolymerized vinyl chloride, will dissolve in heated aqueous sodium hydroxide solutions.

The acetone solubility of the copolymers of vinyl chloride and acrylonitrile containing between 45% and 80% combined vinyl chloride is truly remarkable in that polyacrylonitrile is insoluble in acetone, and polyvinyl chloride of a molecular weight comparable to that of the vinyl chloride-acrylonitrile copolymer, for instance, a vinyl chloride polymer having a specific viscosity of 0.550 in nitrobenzene, is substantially insoluble in acetone; only 21.3% of this resin being extractable by acetone. Heretofore, acetone-soluble copolymers of acrylonitrile have been produced only by copolymerizing acrylonitrile with relatively large amounts of a monomer which in polymeric form is itself highly soluble in acetone, such as vinyl acetate. Such copolymers of acrylonitrile and vinyl acetate do not have the high softening point and high strength which characterize the copolymers of this invention.

The copolymers of vinyl chloride and acrylonitrile of this invention are desirably produced by emulsifying the monomers in the proper proportions in water containing an emulsifying agent and a polymerization catalyst, and heating the emulsion at temperatures of about 30° to 80° C. Temperatures of 30° to 60° C. are preferred. The monomers conjointly polymerize at a rate dependent on the temperature, the catalyst concentration, and the concentration of acrylonitrile in the monomer mixture, and a suspension of the copolymer in water is produced. It has been found that if the polymerization reaction is carried to yields beyond a few per cent, the resin produced becomes non-uniform in composition, even though it is acetone-soluble and the combined vinyl chloride content is within the range of 45% to 80%. This relationship is illustrated in Figure 2 in which the percentage of combined vinyl chloride in the copolymer is plotted against the percentage yield of copolymer, in a polymerization in which vinyl chloride and acrylonitrile were charged in the ratio of 93 to 7 by weight. In this figure, curve A represents the composition of the instantaneous copolymer formed, and curve B represents the average composition of the entire copolymer, for different yields of the copolymer. These curves illustrate how the composition of the resin changes with the yield, because the ratio of monomeric vinyl chloride to monomeric acrylonitrile is constantly changing due to the greater rate at which the acrylonitrile copolymerizes.

For certain purposes, such as for the production of artificial fibers as described in application Serial No. 478,010 of our co-workers Feild, Rugeley, and Petrokubi, filed March 4, 1943, resins of a high degree of uniformity are desired. It has been found that uniform resins can be produced by the continuous or intermittent addition of acrylonitrile to the polymerization vessel, in order to maintain the ratio of vinyl chloride monomer to acrylonitrile monomer in the polymerization vessel approximately constant. Acrylonitrile is added to the polymerization vessel at such a rate that correction is maintained for the difference in rate of copolymerization between acrylonitrile and vinyl chloride and resins of substantially uniform composition are obtained. It has been discovered that products of even greater uniformity result if vinyl chloride is distilled from the polymerization vessel, and the added acrylonitrile is diluted with an amount of vinyl chloride equal to that distilled, and the mixture added to the polymerization vessel. In one method of accomplishing this, the distilled vinyl chloride vapor is condensed continuously, the added acrylonitrile mixed with the condensate, and the mixture returned to the polymerization vessel. In this method, the amount of vinyl chloride condensed is generally 50 to 100 times the weight of the acrylonitrile mixed with it. By this means, there is avoided any tendency of the added acrylonitrile to polymerize by itself, or with only small amounts of vinyl chloride, before it is uniformly dispersed.

Uniform polymerization products may also be formed by a continuous polymerization process in which the vinyl chloride and acrylonitrile in appropriate proportions, one or more emulsifying agents, water and the polymerization catalyst or catalysts, are mixed and fed to an autoclave containing vinyl chloride and acrylonitrile emulsified in water. The monomeric ratio of vinyl chloride to acrylonitrile in the autoclave is maintained at a value between 5.06 to 1 and 49.0 to 1, in order that acetone-soluble resins may be produced. Thus, of the total monomeric reactants, between 2% and 16.5% thereof is acrylonitrile, the remainder being vinyl chloride. For the production of a uniform resin, however, this ratio should be maintained at a constant value within said range. The heat of polymerization may be removed by permitting some of the vinyl chloride to evaporate, condensing it under pressure, in view of the fact that this substance boils at −13.9° C., and recycling the condensed vinyl chloride to the autoclave. Heat control may also be provided by means of cooling coils or jackets. A resin suspension is withdrawn from the autoclave at a rate corresponding to the rate of resin formation, thus keeping the concentration of resin approximately constant in the autoclave. The vinyl chloride, acrylonitrile, water, catalyst and emulsifying agent are also added to the autoclave at a rate which will maintain constant the quantity of these materials in the vessel, taking into consideration that all these materials are also withdrawn as components of the resin suspension. The vinyl chloride and acrylonitrile thus withdrawn are removed and recycled in the process. Thus, the ratio of vinyl chloride to acrylonitrile in the mixture added to the polymerization will be greater than the ratio of combined vinyl chloride to acrylonitrile in the copolymer resin.

Another method of producing uniform copolymers is to charge an autoclave with vinyl chloride and acrylonitrile in the proper proportions, and then withdraw monomeric vinyl chloride from the autoclave at such a rate as to maintain the monomeric ratio of vinyl chloride to acrylonitrile approximately constant. Control may be exercised by keeping the pressure within the autoclave constant, as the pressure would otherwise tend to rise with an increasing ratio of vinyl chloride monomer to acrylonitrile monomer.

The conjoint polymerization of vinyl chloride and acrylonitrile proceeds at a much higher rate when the monomers are emulsified in water than when they are polymerized under any other conditions. The emulsion may be formed very readily by agitation of the monomers in water under suitable pressure, as vinyl chloride is normally a gas, in the presence of emulsifying agents. Examples of suitable emulsifying agents are sodium di(2-ethylhexyl) sulphosuccinate, sodium dihexyl sulphosuccinate, sodium lauryl sulphate, sodium tetradecyl sulphate, alkylated aryl sulphates, sodium myristyl sulphate and other sodium salts of the various fatty alcohol sulphates. The ratio of monomers to water by weight may vary from 1:1 to 1:3 or higher, but very dilute emulsions necessitate handling and heating large amounts of water relative to the amount of resin produced. The rate of polymerization will vary depending on the conditions, such as the temperature, the catalyst and amount thereof employed, and the monomeric ratio of vinyl chloride to acrylonitrile. The rate of polymerization at 40° C., in the presence of potassium persulphate as a catalyst in the amount of 1% of the monomers, and with a monomer to water ratio of 1 to 3 and a vinyl chloride-acrylonitrile ratio of about 93 to 7, is about 0.9 to 1.1% of the monomers copolymerized per hour. The rate of polymerization is a direct function of the polymerization temperature. Thus, the rate of polymerization of the above mixture at 45° C. is 2.0% of the monomers copolymerized per hour; at 48° C. the rate is 2.5% per hour; and at 50° C. the rate is 2.9% per hour. The rate of polymerization of the same mixture at 50° C. but with 0.50% potassium persulphate catalyst based on the monomers is 1.6 to 1.8% per hour. In general, oxygen-yielding catalysts are preferred, such as hydrogen peroxide, ammonium persulphate and benzoyl peroxide.

The polymerization may be carried to high yields, for instance, 80% to 85%, or even higher, without the suspension breaking or becoming non-fluid. The resin suspension, or hydrosol, withdrawn from the autoclave may be broken by adding an equal volume of a solvent, such as acetone, agitating the suspension and permitting the coagulated resin to settle. Coagulation and settling may be facilitated by the addition of ionic solutions, such as salt or acid solutions, which aid in breaking the electrostatic forces holding the resin particles in suspension. After settling, the supernatant liquids are withdrawn and the resin washed and dried.

The process of this invention may be employed to produce resins of a wide range of molecular weights, represented by a specific viscosity of about 0.10 to 0.60, depending on the polymerization conditions. The specific viscosity is determined by the following equation:

$$\text{Sp. visc.} = \frac{\text{viscosity of 0.1 gm. resin in 50 c.c. of acetonyl acetone}}{\text{viscosity of acetonyl acetone}} - 1$$

The viscosities are measured with an Ostwald viscosimeter at 20° C. The lower molecular weight resins may be produced by the addition of small amounts of aldehydes to the monomeric vinyl chloride and acrylonitrile charged to the polymerization autoclave.

The softening point of the vinyl chloride-acrylonitrile copolymers of this invention is higher than that of polyvinyl chloride, as shown by flow temperatures of 157° C. and approximately 225° C. for resins containing 62.1% and 56.1% respectively of vinyl chloride, as compared to a flow temperature of 147.5° C. for polyvinyl chloride of the grade given above. The flow temperature was determined in the Bakelite-Olsen flow tester, and is defined as the temperature at which the flow of resin is 0.50 inch per minute through a ⅛ inch diameter channel under a pressure of 3000 pounds per square inch. The initial heat distortion point for the resin containing 62.1% vinyl chloride was 82° C. as determined by the A. S. T. M. method, a value which is 10° to 15° C. higher than for the comparable acetone-soluble copolymers of vinyl chloride with vinyl acetate, and about 8° C. higher than polyvinyl chloride. Resins of lower vinyl chloride content within the range of this invention have still higher softening points. Another valuable characteristic of the new copolymers is that the rate of softening or deformation does not appear to increase sharply once the initial distortion temperature is exceeded. In this, the new resins are to be distinguished from other thermoplastic resins.

The acetone solubility of the new copolymers of acrylonitrile with vinyl chloride coupled with the high softening point of these resins, makes the resins valuable in the production of artificial fibers which will not soften in boiling water and which do not shrink excessively at temperatures of 100° C. Once the fibers have been shrunk, however, they remain dimensionally stable at temperatures up to 125° C., and at 150° C., the shrinkage is only about 8%. In addition, the resin solutions may be cast into films which are strong and flexible. In addition to being soluble in acetone, the new resins are soluble in cyclohexanone, acetonyl-acetone, propylene oxide and some of the nitroparaffins, such as nitroethane, which are more suitable for the production of lacquers and coating compositions than acetone. A mixture of acetone and propylene oxide in the ratio of 4 to 1 is a better solvent for the copolymers containing from 55% to 60% vinyl chloride than either acetone or propylene oxide alone, and this mixture is useful for the production of spinning dopes from such resins.

The resins of this invention are chemically stable, and they are resistant to salt solutions, acids, alkalies, oils, and greases. The resins have much better ultimate heat stability than other resins containing polymerized vinyl chloride. For instance, an unstabilized film of a vinyl chloride-acrylonitrile copolymer of this invention, baked on an iron panel will not become decomposed after 1 to 1.5 hours heating at 350° F., whereas a similar film of an unstabilized copolymer of vinyl chloride with vinyl acetate will become blackened after 5 to 10 minutes heating. When the resins containing 1% lead stearate as a stabilizer are heated in molded form, they have a heat stability at 135° C. greater than six hours, which is superior to that of other vinyl chloride resins. Other basic stabilizers may be used, such as have heretofore been proposed for resins containing polymerized vinyl chloride. As examples of such stabilizers, there may be mentioned lead and calcium salts of the higher fatty acids, alkaline earth metal alcoholates, alkaline earth metal chelate derivatives of acetoacetic esters, and organo-metallic tin and lead salts of carboxylic acids.

The vinyl chloride-acrylonitrile copolymers may be combined with compatible plasticizers, but the resins are not readily plasticized with most plasticizers. The resins of high vinyl chloride content appear more compatible with the usual plasticizers for vinyl resins. Many of the customary plasticizers may be employed for this purpose, such as dibutyl phthalate, diethyl phthalate, dioctyl phthalate, dibutyl sebacate, triethylene glycol di(2-ethyl butyrate), methyl phthalyl ethyl glycollate, butyl phthalyl butyl glycollate, tricresyl phosphate, tributyl phosphate, trioctyl phosphate and trioctyl tricarballylate. Other promising plasticizers are those which are high in oxygen content. Examples of this latter type are di-pentaerythritol triacetate tripropionate, pentaerythritol tetrapropionate, and pentaerythritol diacetate dipropionate. The plasticizers can be combined with the resins by wetting the resins with the plasticizer, and working the mass on a heated roll mill until the plasticizer and resin are fluxed.

Molded objects made from the new resins have high strengths and softening points. Suitable molding temperatures are about 180° C. An impact strength of 0.53 foot pound by the Izod pendulum method has been determined for such molded objects. Fillers, lubricants and plasticizers may be included in such molding compositions. Also, the copolymers of vinyl chloride and acrylonitrile of the composition previously stated, are very valuable ingredients of lacquers and coating compositions by reason of their chemical resistance and high softening points.

The preparation and utility of several copolymers of vinyl chloride and acrylonitrile containing from 45% to 80% combined vinyl chloride may be illustrated by several examples.

*Example 1*

One part of potassium persulphate, as a catalyst, and one part of sodium di(2-ethylhexyl)

sulphosuccinate, as an emulsifying agent, were dissolved in 300 parts of water and placed in an autoclave equipped with a propeller-type agitator. Ninety-two (92) parts of vinyl chloride and eight parts of acrylonitrile were premixed and charged in liquid form under pressure to the autoclave. The autoclave was closed, the agitator started and the temperature raised to 40° C. Only moderate to slight agitation was required to emulsify the mixture. The pressure was maintained at about 75 to 76 pounds per square inch after the greater part of the trapped inert gases had been vented. After an induction period of about three hours, polymerization commenced. The ratio of monomeric vinyl chloride to monomeric acrylonitrile in the autoclave was maintained approximately constant by the addition of 1.43 parts of acrylonitrile to the autoclave every four hours. The effect of each addition was to reduce the pressure in the autoclave to its original value. After seventy-seven hours operation, during which nineteen additions of acrylonitrile had been made, the resin suspension contained 19.6% solids and the yield of copolymer was 65.8%. The final vinyl chloride content of the resin was 60.5% and the specific viscosity was 0.259. The vinyl chloride content of the resin formed during the polymerization was approximately constant as shown by the following table:

| Hours Operation | Per cent Vinyl Chloride in Resin |
|---|---|
| 14.5 | 60.9 |
| 23.5 | 60.2 |
| 41.0 | 60.9 |
| 52.5 | 60.9 |
| 77.0 | 60.5 |

The pressure was released on the autoclave, and most of the monomeric vinyl chloride and some of the acrylonitrile were removed in vapor form for recovery. The resin suspension was coagulated by adding an equal volume of acetone, agitating the suspension and allowing it to settle. Settling may be facilitated by the addition of 0.5% by weight of calcium chloride based on the resin in aqueous solution. The coagulated resin was washed three times with water and dried. It was soluble in acetone to give a clear, easily filterable solution suitable as a spinning dope for the production of artificial fibers or as a casting solution for the production of films.

*Example 2*

The following ingredients were charged to an autoclave:

| | Parts |
|---|---|
| Vinyl chloride | 92 |
| Acrylonitrile | 8 |
| Potassium persulphate | 0.5 |
| Sodium di-(2-ethylhexyl) sulphosuccinate | 1 |
| Distilled water | 300 |

The polymerization was started as in Example 1, but the temperature was raised to 50° C. and the pressure was correspondingly higher. Acrylonitrile was added during the run whenever the total solids in the charge had increased by an increment (by difference) of 1%. Thus, 2.82 parts of acrylonitrile were added when the total solids content was 2% and 4% respectively. Thereafter 1.41 parts of acrylonitrile were added at each 1% increment in total solids content. In all, twenty-one additions were made in 47.5 hours, when the polymerization was stopped at a total solids content of 24.0%. The yield of resin was 78.5; its combined vinyl chloride content was 58.9, and its specific viscosity was 0.345. The uniform composition of the resin is shown by the following analysis of the copolymer made during the course of the polymerization:

| Hours Operation | Per cent Vinyl Chloride in Copolymer |
|---|---|
| 8.0 | 59.1 |
| 12.5 | 60.1 |
| 28.5 | 58.9 |
| 47.5 | 58.9 |

*Example 3*

The following materials were charged to an autoclave:

| | Parts |
|---|---|
| Vinyl chloride | 92 |
| Acrylonitrile | 8 |
| Sodium di(2-ethylhexyl) sulphosuccinate | 1 |
| Potassium persulphate | 1 |
| Distilled water | 300 |

The temperature was raised to 40° C. and the polymerization started as in Example 1. In this case, however, the acrylonitrile was added continuously by means of a small gear pump at a rate of 0.317 part per hour. After sixty hours, when 19.0 parts of acrylonitrile had been added, a copolymer containing 61.6% vinyl chloride was obtained at a yield of 47.2%. The specific viscosity of the resin was 0.316. The copolymer was of uniform composition as shown by the analysis of the resin formed during the run.

| Hours Operation | Per cent Vinyl Chloride in Resin |
|---|---|
| 20 | 61.7 |
| 30 | 61.4 |
| 40 | 61.6 |
| 60 | 61.7 |

*Example 4*

This example illustrates the embodiment of the invention in which the acrylonitrile is diluted with vinyl chloride before addition to the autoclave. This method of operation prevents any tendency for very small fractions of copolymers high in acylonitrile to form. Such fractions tend to form small gel-like particles in spinning dopes of the resin, which tends to clog the spinnerettes.

This was accomplished by charging the following mixture to a specially equipped autoclave:

| | Parts |
|---|---|
| Vinyl chloride | 92 |
| Acrylonitrile | 8 |
| Sodium di(2-ethylhexyl) sulphosuccinate | 1 |
| Potassium persulphate | 1 |
| Distilled water | 300 |

The autoclave was equipped with an updraft reflux condenser and the acrylonitrile was added to the returned liquid vinyl chloride through a tube having a small needle-type valve equipped with a "dropper" and sight glass, whereby the rate of addition of the acrylonitrile to the refluxed vinyl chloride could be observed by counting the number of drops added in a given time.

The polymerization was carried out at 40° C., and the vinyl chloride was refluxed at a rate varying from 22 to 55 parts per hour. The average rate of addition of the acrylonitrile was 0.46 part per hour. The duration of the run was fifty-nine hours, and during this time 27.2 parts of acrylonitrile were added. Seventy (70) parts of copolymer resin were obtained at a yield of 62.8%. The combined vinyl chloride content of the resin was 56.1% and its specific viscosity was 0.432. The resin was dissolved in acetone and clear solutions were obtained, free from gel-like particles. Yarn produced from this resin had a softening point appreciably higher than yarn produced from the resins of the preceding examples.

*Example 5*

Ninety (90) parts of vinyl chloride, 10 parts of acrylonitrile, 5 parts of acetaldehyde and 1 part of potassium persulphate were emulsified in 400 parts of water containing 1 part of sodium di(2-ethylhexyl) sulphosuccinate within a polymerization autoclave. The temperature was raised to 40° C., and the polymerization started after an induction period of thirteen hours. During the course of the polymerization, 12.0 parts per hour of acrylonitrile were added at intervals and the polymerization continued until a yield of 53% was obtained at the end of sixty-three hours. The final solids content of the suspension was 11.0%. The resin had a lower molecular weight, as shown by its viscosity of 0.122, and had a combined vinyl chloride content of 65.7%. It had a flow temperature of 155° C. as measured by the Bakelite-Olsen flow tester. It was more soluble in organic solvents than the resin produced according to the previous examples. It was useful in the production of lacquers and coating compositions.

From the above examples, it is apparent that very uniform products may be produced by the process of this invention. For some applications, as in molding compositions, resins of such a high degree of uniformity may not be required, and for the production of such resins, the additions of acrylonitrile need not be as frequent. Resins in which the spread of combined vinyl chloride content is 10% by difference, i. e., the molecular fractions comprising the resin contain from 55% to 65% by weight of combined vinyl chloride are of value. Resins in which an extreme spread of vinyl chloride content between 45% and 80% exists in the different molecular fractions would be of value for applications where variations in the physical properties are not excluded. However, uniform resins of vinyl chloride contents within the range of this invention are generally useful, but not necessarily for the same application. Thus, a uniform resin having a vinyl chloride content of about 50% has a very high softening point, but is near the acetone solubility limit and is more useful in plastic compositions than in coatings. Also, a uniform resin having a vinyl chloride content of about 75% has better solubility characteristics even though it is near the upper limit of solubility in acetone, and it is more useful in coating compositions than as a fiber resin, because of its somewhat lower softening temperature.

In general, the resins of this invention are useful for the production of films and fibers, and for molding, adhesive, laminating, coating, impregnating and decorative purposes. The resins may be modified after their formation by the addition of other resins, or by chemical treatment. All such modifications are included within the scope of the invention.

We claim:

1. A completely acetone-soluble copolymer of vinyl chloride and acrylonitrile, 0.1 gram of which copolymer in 50 cc. of acetonyl acetone has a specific viscosity at 20° C. of between 0.1 and 0.6 and formed by the conjoint polymerization of vinyl chloride and acrylonitrile while maintaining the monomers within the range from 5.06 to 49.0 parts of monomeric vinyl chloride to one part of monomeric acrylonitrile by weight.

2. A copolymer of vinyl chloride and acrylonitrile which is completely soluble in acetone, 0.1 gram of which copolymer in 50 cc. of acetonyl acetone has a specific viscosity at 20° C. of between 0.1 and 0.6, all portions of said copolymer having a combined vinyl chloride content within the range of 50% to 75% by weight and being formed by the conjoint polymerization of vinyl chloride and acrylonitrile in a monomer ratio maintained within the range from 5.06 to 49.0 parts of monomeric vinyl chloride to one part of monomeric acrylonitrile by weight.

3. A completely acetone-soluble copolymer of vinyl chloride and acrylonitrile, 0.1 gram of which copolymer in 50 cc. of acetonyl acetone has a specific viscosity at 20° C. of between 0.1 and 0.6, substantialy all portions of which copolymer contain from about 56% to 66% by weight of combined vinyl chloride, said copolymer being formed by the conjoint polymerization of vinyl chloride and acrylonitrile while maintaining the monomers within the range from 5.06 to 49.0 parts of monomeric vinyl chloride to one part of monomeric acrylonitrile by weight.

4. A uniform artificial resin which is completely soluble in acetone, said resin being a copolymer of vinyl chloride and acrylonitrile, 0.1 gram of which copolymer in 50 cc. of acetonyl acetone has a specific viscosity at 20° C. of between 0.1 and 0.6, the said copolymer being formed by the conjoint polymerization of vinyl chloride and acrylonitrile while maintaining an approximately constant monomer ratio within the range from 5.06 to 49.0 parts of monomeric vinyl chloride to one part of monomeric acrylonitrile by weight.

5. Process for making an acetone-soluble copolymer of vinyl chloride and acrylonitrile, which comprises emulsifying vinyl chloride and acrylonitrile in water in the ratio of 5.06 to 49.0 parts of monomeric vinyl chloride to one part of monomeric acrylonitrile, and copolymerizing the vinyl chloride and acrylonitrile while maintaining the monomeric ratio of vinyl chloride to acrylonitrile within said values.

6. Process for making an acetone-soluble copolymer of vinyl chloride and acrylonitrile, which comprises emulsifying vinyl chloride and acrylonitrile in water in the ratio of 5.06 to 49.0 parts of monomeric vinyl chloride to one part of monomeric acrylonitrile, copolymerizing the vinyl chloride and acrylonitrile, and adding monomeric acrylonitrile to the polymerization reaction in such quantities as to maintain the monomeric ratio of vinyl chloride to acrylonitrile within said values.

7. Process for making an acetone-soluble copolymer of vinyl chloride and acrylonitrile, which comprises emulsifying vinyl chloride and acrylonitrile in water in the ratio of 5.06 to 49.0 parts of monomeric vinyl chloride to one part of monomeric acrylonitrile, copolymerizing the vinyl chloride and acrylonitrile, and continuously adding monomeric acrylonitrile to the polymerization reaction in such quantities as to maintain the said monomeric ratio within said values.

8. A continuous process for making an acetone-soluble copolymer of vinyl chloride and acrylonitrile, which comprises introducing monomeric vinyl chloride and acrylonitrile to a polymerization vessel, maintaining an emulsion of monomeric vinyl chloride and acrylonitrile in water in said vessel in which the ratio of monomeric vinyl chloride to acrylonitrile is between 5.06 to 49.0 parts of monomeric vinyl chloride to one part of monomeric acrylonitrile, copolymerizing said monomers in said vessel, and withdrawing a copolymer of vinyl chloride and acrylonitrile containing from 45% to 80% combined vinyl chloride.

9. A continuous process for making an acetone-soluble copolymer of vinyl chloride and acrylonitrile, which comprises introducing monomeric vinyl chloride and acrylonitrile to a polymerization vessel, maintaining an emulsion of monomeric vinyl chloride and acrylonitrile in water in said vessel in which the ratio of monomeric vinyl chloride to acrylonitrile is between 5.06 to 49.0 parts of monomeric vinyl chloride to one part of monomeric acrylonitrile, copolymerizing said monomers in said vessel, and withdrawing a copolymer of vinyl chloride and acrylonitrile containing from 45% to 80% combined vinyl chloride, the ratio of monomeric vinyl chloride to acrylonitrile introduced to the polymerization vessel being greater than the ratio of combined vinyl chloride to combined acrylonitrile in said copolymer.

10. Process for making an acetone-soluble copolymer of vinyl chloride and acrylonitrile, which comprises emulsifying vinyl chloride and acrylonitrile in water in the ratio of 5.06 to 49.0 parts of monomeric vinyl chloride to one part of acrylonitrile to form an emulsion, copolymerizing the vinyl chloride and acrylonitrile, evaporating vinyl chloride from the emulsion and maintaining the said monomeric ratio within said values.

11. Process for making an acetone-soluble copolymer of vinyl chloride and acrylonitrile, which comprises emulsifying monomeric vinyl chloride and acrylonitrile in water in the ratio of 5.06 to 49.0 parts of the vinyl chloride to one part of acrylonitrile, copolymerizing the vinyl chloride and acrylonitrile at a temperature of 30° to 80° C., evaporating and withdrawing part of the monomeric vinyl chloride during the polymerization, introducing into the reaction mixture a mixture of liquid vinyl chloride and acrylonitrile, and maintaining the ratio of vinyl chloride to acrylonitrile in the aqueous emulsion within the said range during the polymerization.

12. Process for making an acetone-soluble copolymer of vinyl chloride and acrylonitrile, which comprises emulsifying monomeric vinyl chloride and acrylonitrile in water in the ratio of 5.06 to 49.0 parts of the vinyl chloride to one part of acrylonitrile, copolymerizing the vinyl chloride and acrylonitrile at a temperature of 30° to 80° C., evaporating monomeric vinyl chloride during the polymerization and condensing such vinyl chloride, adding acrylonitrile to the condensed vinyl chloride in such amounts as to maintain the ratio of monomeric vinyl chloride to acrylonitrile within the said values during the polymerization, and introducing the mixture thus formed to the polymerization.

13. Process for making an acetone-soluble copolymer of vinyl chloride and acrylonitrile containing from 45% to 80% combined vinyl chloride, which comprises emulsifying vinyl chloride and acrylonitrile in water containing an emulsifying agent, in the ratio of 5.06 to 49.0 parts of monomeric vinyl chloride to one part of monomeric acrylonitrile, copolymerizing the vinyl chloride and acrylonitrile at a temperature between 30° and 60° C. in the presence of a polymerization catalyst, adding acrylonitrile to the polymerization and maintaining the monomeric ratio of vinyl chloride to acrylonitrile at an approximately constant value within said range.

14. Process for making an acetone-soluble copolymer of vinyl chloride and acrylonitrile containing from 56% to 62% combined vinyl chloride, which comprises emulsifying vinyl chloride and acrylonitrile in water containing an emulsifying agent, in the ratio of about 11.5 parts of monomeric vinyl chloride to one part of monomeric acrylonitrile, copolymerizing the vinyl chloride and acrylonitrile at a temperature between 30° and 60° C. in the presence of a polymerization catalyst, adding acrylonitrile to the polymerization and maintaining the monomeric ratio of vinyl chloride to acrylonitrile at an approximately constant value.

15. Process for making an acetone-soluble copolymer of vinyl chloride and acrylonitrile, which comprises emulsifying vinyl chloride and acrylonitrile in water containing an emulsifying agent in the ratio of 5.06 to 49.0 parts of monomeric vinyl chloride to one part of monomeric acrylonitrile, and copolymerizing the vinyl chloride and acrylonitrile in the presence of an alkali metal persulfate as a catalyst while maintaining the said monomeric ratio within said values.

16. Process for making an acetone-soluble copolymer of vinyl chloride and acrylonitrile, which comprises emulsifying vinyl chloride and acrylonitrile in water containing sodium di(2-ethylhexyl) sulfosuccinate in the ratio of 5.06 to 49.0 parts of monomeric vinyl chloride to one part of monomeric acrylonitrile, and copolymerizing the vinyl chloride and acrylonitrile in the presence of potassium persulfate as a catalyst while maintaining the said monomeric ratio within said values.

17. Process for making an acetone-soluble copolymer of vinyl chloride and acrylonitrile which comprises emulsifying vinyl chloride and acrylonitrile in water in the ratio of 5.06 to 49.0 parts of monomeric vinyl chloride to one part of monomeric acrylonitrile, and copolymerizing the vinyl chloride and acrylonitrile in the presence of acetaldehyde while maintaining the said monomeric ratio within said values.

18. Process for making an acetone-soluble copolymer of vinyl chloride and acrylonitrile, which comprises subjecting to polymerization in the presence of a polymerization catalyst an aqueous emulsion of vinyl chloride and acrylonitrile, while maintaining the acrylonitrile present in such mixture in an approximately uniform amount corresponding to between 2% and 16.5% of the total weight of the vinyl chloride and acrylonitrile in such emulsion.

19. Process for making an acetone-soluble copolymer of vinyl chloride and acrylonitrile containing from 45% to 80% of combined vinyl chloride, which comprises heating and copolymerizing vinyl chloride and acrylonitrile in an aqueous emulsion wherein the vinyl chloride and acrylonitrile are maintained in the ratio of from 5.06 parts to 49 parts of the former to one part of the latter, in the presence of a polymerization catalyst, while vaporizing and refluxing portions of the vinyl chloride, condensing at least a portion of the vaporized vinyl chloride, mixing the resultant condensate with an amount of acrylonitrile corresponding to the amount of the latter removed from said emulsion by polymerization, introducing the resultant liquid mixture of vinyl chloride and acrylonitrile into the aqueous emulsion undergoing polymerization, thereby inhibiting polymerization of the acrylonitrile per se before the latter has been intimately mixed with the vinyl chloride of such emulsion.

LELAND C. SHRIVER.
GEORGE H. FREMON.

REFERENCES CITED

The following references are of record in the file of this patent:

UNITED STATES PATENTS

| Number | Name | Date |
| --- | --- | --- |
| 2,100,900 | Fikentscher et al. | Nov. 30, 1937 |
| 2,147,154 | Fikentscher et al. | Feb. 14, 1939 |
| 2,123,599 | Fikentscher et al. | July 12, 1938 |
| 1,933,052 | Fikentscher et al. | Oct. 31, 1933 |
| 2,316,197 | Tucker | Apr. 13, 1943 |

FOREIGN PATENTS

| Number | Country | Date |
| --- | --- | --- |
| 459,596 | Great Britain | Jan. 1937 |
| 685,257 | Germany | Dec. 14, 1939 |
| 746,969 | France | Mar. 21, 1933 |